United States Patent
Pluimers

(10) Patent No.: US 11,386,763 B2
(45) Date of Patent: Jul. 12, 2022

(54) LUMINAIRE NETWORK WITH SENSORS

(71) Applicant: Schreder S.A., Brussels (BE)

(72) Inventor: Guy Pluimers, Awans (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 15/733,221

(22) PCT Filed: Dec. 12, 2018

(86) PCT No.: PCT/EP2018/084516
§ 371 (c)(1),
(2) Date: Jun. 11, 2020

(87) PCT Pub. No.: WO2019/115599
PCT Pub. Date: Jun. 20, 2019

(65) Prior Publication Data
US 2020/0357257 A1 Nov. 12, 2020

(30) Foreign Application Priority Data
Dec. 12, 2017 (BE) .................................. 20175927

(51) Int. Cl.
*G08B 19/00* (2006.01)
*G08B 13/196* (2006.01)
(Continued)

(52) U.S. Cl.
CPC ....... *G08B 19/00* (2013.01); *G08B 13/19695* (2013.01); *G08B 21/10* (2013.01);
(Continued)

(58) Field of Classification Search
CPC .. G08B 21/10; G08B 13/19695; G08B 31/00; G08B 25/10; G08B 19/00; H05B 47/19; H05B 47/12; H04L 67/12
(Continued)

(56) References Cited

U.S. PATENT DOCUMENTS 9,860,965 B2 * 1/2018 Recker ................ H02J 13/0017
10,417,570 B2 * 9/2019 Florence .............. H05B 47/105
(Continued)

OTHER PUBLICATIONS

PCT International Search Report and Written Opinion, PCT International Application No. PCT/EP2018/084516, dated Mar. 14, 2019.

*Primary Examiner* — Eric Blount
(74) *Attorney, Agent, or Firm* — McDonnell Boehnen Hulbert & Berghoff LLP

(57) ABSTRACT

The invention relates to a luminaire network comprising a plurality of luminaires as well as a central unit, and comprising a central communication unit. A plurality of luminaires in the network comprises a communication unit configured to make it possible for the luminaires to communicate with each other and/or with the central communication unit, as well as a control unit configured to control the luminaire as well as the communication unit. The central unit comprises information about the location of the luminaires. A plurality of the luminaires in the luminaire network further comprise at least one sensor which can sense information relating to the environment of the luminaire, wherein the communication unit of said luminaires is configured to send messages relating to the sensed information to the central communication unit, and the central unit is configured to analyze the received messages and to output the results of the analysis.

20 Claims, 2 Drawing Sheets

(51) Int. Cl.
  *G08B 21/10* (2006.01)
  *H05B 47/12* (2020.01)
  *H05B 47/125* (2020.01)
  *H05B 47/175* (2020.01)
  *H04L 67/12* (2022.01)

(52) U.S. Cl.
  CPC .......... *H05B 47/12* (2020.01); *H05B 47/125* (2020.01); *H05B 47/175* (2020.01); *H04L 67/12* (2013.01)

(58) Field of Classification Search
  USPC ...... 340/573.6, 915.4, 815.45, 815.5, 815.66
  See application file for complete search history.

(56) References Cited

U.S. PATENT DOCUMENTS

| | | | |
|---|---|---|---|
| 10,499,477 B2* | 12/2019 | Chen | H05B 47/12 |
| 2009/0002148 A1* | 1/2009 | Horvitz | G08G 1/097 |
| | | | 340/514 |
| 2012/0038490 A1* | 2/2012 | Verfuerth | G08G 1/0133 |
| | | | 340/910 |
| 2015/0254570 A1* | 9/2015 | Florence | H05B 47/105 |
| | | | 706/52 |
| 2015/0339919 A1* | 11/2015 | Barnett | H05B 47/105 |
| | | | 340/907 |
| 2016/0171312 A1* | 6/2016 | Aoki | G06K 9/00785 |
| | | | 382/105 |
| 2017/0228874 A1* | 8/2017 | Roberts | G06T 5/50 |

* cited by examiner

LUMINAIRE NETWORK WITH SENSORS

CROSS-REFERENCE TO RELATED APPLICATION

The present application is a national stage entry of PCT/EP2018/084516 filed on Dec. 12, 2018, which claims priority to BE 20175927 filed on Dec. 12, 2017, the contents of each of which are hereby incorporated by reference.

FIELD OF THE INVENTION

The field of the invention relates to networks of luminaires comprising communication units.

BACKGROUND

Luminaires are increasingly getting "smarter", in the sense that they may be outfitted with control units which allow for sophisticated control of the lights in the luminaires, and in that they now may comprise communication units which allows a network of luminaires to be controlled from a central point, and which may even allow the luminaires to communicate with one another. Such a network of connected luminaires may be used to provide customized lighting, and in particular may allow an operator to program and adapt certain lighting behaviors. This may be for instance be done using a visual interface which shows the location of the various luminaires on a map. In order to be able to do this, the location of each luminaire in the luminaire network must be known.

While the programming and capabilities of such luminaire networks are increasing, most of the development has focused on improving lighting capacities, ignoring the many additional possibilities such a luminaire network may provide.

SUMMARY

The object of embodiments of the invention is to take advantage of the possibilities offered by luminaire networks.

According to a first aspect of the invention there is provided a luminaire network comprising a plurality of luminaires as well as a central unit, comprising a central communication unit. A plurality of the luminaires comprise a communication unit configured to make it possible for the luminaires to communicate with each other and/or with the central communication unit and a control unit configured to control the luminaire as well as the communication unit. The central unit is configured to have access to information about the location of the luminaires. A plurality of the luminaires in the luminaire network further comprise at least one sensor which can sense information relating to the environment of the luminaire, wherein the communication unit of said luminaires is configured to send messages relating to the sensed information to the central communication unit and/or to at least one other luminaire comprising a communication unit. The central unit and/or the at least one other luminaire is configured to analyze the received messages and to output the results of the analysis.

The inventive insight underlying the invention is that luminaire networks provide a dense, well-distributed network of mapped devices which are provided with basic or advanced computing facilities as well as communication possibilities. Therefore, luminaire networks may be very useful beyond just their lighting capabilities. In the embodiments described in what follows, use is made of at least one type of sensor, and information may be aggregated, collected and analyzed from a plurality of luminaires.

While the description will, for the sake of simplicity, assume one luminaire control unit per luminaire, in practice a plurality of luminaires, for instance a plurality of luminaires on a same location such as for example on a same pole, may be controlled by a single luminaire control unit.

The communication unit may be a communication unit for wired communication using a protocol chosen from Ethernet, TCP/IP, Modbus, RS-485, DALI, interbus, fiber optics. The communication unit may rather (or additionally) be a communication unit for powerline communication based on one of PLC, HD-PLC, BPL. The communication unit may rather (or additionally) be a communication unit for wireless communication using a protocol chosen from among Bluetooth, WiFi, RFID, NFC, LoRA, Zigbee, Thread, Sigfox, GSM, GPRS, LTE, 2G, 3G 4G and 5G, Lifi, Wimax, etc. A combination of aforementioned protocols and/or communication units may also be used. In what follows, a wireless communication unit will be assumed, but this is not intended to be limitative.

Furthermore, when the word "RF" is used in the present specification, it is intended to be interpreted broadly, as it often is in the art, covering any sensor able to sense electro-magnetic fields around its position allowing the system to retrieve data and metadata generated by the wireless communication of other device through known data transmission systems such as Radio frequencies, Bluetooth, WiFi, RFID, NFC, LoRA, Zigbee, Thread, Sigfox, GSM, GPRS, LTE, 2G, 3G 4G and 5G, Wimax.

The central unit may have access to location information of the luminaires in different ways. For instance, upon installation, the skilled person installing the luminaire could report the location information (for instance in the form of latitude/longitude information, but it could also be in the form of a street address) together with data to identify the luminaire to the central unit, and thus create a map. Luminaires may also be outfitted with GPS or other location sensors and report their location to the central unit, either once or several times. The skilled person will be aware of alternatives that allow the central unit to have access to information about the location of the luminaires.

Note that the central unit need not be any defined physical unit: processing 'in the cloud' also falls within processing in the central unit according to the terms of this application. While all processing may be performed centrally, which allows for the control unit of the individual luminaires to be relatively simple, it is also possible for some or all of the processing to be done by the individual luminaires. To that end, the luminaires comprising at least one sensor may further comprise a processing unit configured to process the sensed information and to generate the message to be sent to the central communication unit or to at least another luminaire comprising a communication unit.

In particular, communication between luminaires, as well as potentially communication from the central unit to the luminaires, may make it possible for distributed computing to be performed by the processing units of the luminaires. The "analysis" performed by the central unit may then consist merely of a visualization of the received processing results. Collaboration between neighboring luminaires may also be used, for instance to confirm or test sensor data or to perform preliminary analysis of sensed information.

The skilled person will be aware of the most advantageous way to distribute the necessary processing between the central unit and the luminaire processing units for the various embodiments, taking into account the necessary processing power at the central unit and of the individual luminaire processing units as well as the bandwidth and other properties of the connection or connections of the wireless communication units of the luminaires.

In embodiments, the at least one sensor comprises at least one camera. The positioning of the camera or cameras may be chosen depending on the intended application. The camera may be a camera configured to record moving images with a common frame rate, a camera which captures a static image at a certain interval of time, or a camera which captures either at least one static image or a moving image upon receipt of a trigger signal, which trigger signal could be received from the central unit or from another luminaire or which could be generated by the processing unit of the luminaire itself. The images (either moving or static) captured by the camera or cameras may be stored locally for a certain amount of time, and/or may be sent to the central unit and/or to at least one other luminaire through the communication unit.

One possible embodiment in which a camera is used is one in which the captured images are analyzed in order to detect the presence of a parked vehicle, for instance an illegally parked vehicle. In this case the camera should be aimed, at least part of the time, at the spot at which a vehicle could potentially park illegally. This embodiment, for instance, lends itself well to local processing, as the illegally parked vehicle will in all likelihood be detectable from a camera that is part of an individual luminaire. However, central analysis of images collected from a plurality of cameras of luminaires at a central unit is also possible.

In this embodiment, images captured at set intervals, for instance every 5-60 seconds, may be sufficient to identify that a vehicle is staying in a certain location at which parking is not allowed for longer than a pre-set amount of time. This embodiment may be configured such that it is taken account where and when people may legally park, and when they cannot. The analysis of the images may also identify the numbers on the license plate of the vehicle. The gathered information, whether the original images, the analysis of when and where a vehicle was illegally parked, and/or the license plate number, may then be communicated to the appropriate legal instance. This may also be done while the vehicle is still illegally parked, which may for instance be useful if the vehicle is stopped at an emergency lane, a bus stop, or other places where it may be desirable to have an illegally parked vehicle towed as soon as possible.

The output may also take several alternative forms. For instance, the central unit may output a map with indications, such as red dots, at points where a vehicle is detected to be illegally parked. The central unit may also collect long term statistics, which may alert instances to places where there may be a lack of legal parking spots.

Note that the above describes instances wherein the embodiment is aimed at detecting illegally parked vehicles. However, the system may also be used to monitor legal parking, in which case it saves users having to pay at a booth or use an app. Furthermore, it is not limited to detection of immobile vehicles, and could also be used—in particular by combining data sensed by different luminaires—to detect vehicles circulating in a wrong place and/or a wrong direction. The skilled person will be aware of many more such applications.

Another possible embodiment in which a camera is used is one in which the images are analyzed to monitor water levels and/or to detect the occurrence of floods. In this embodiment, the luminaires equipped with cameras would for instance be those close to a body of water and/or to an access to the sewers, and these cameras would be appropriately located and aimed. Techniques to measure distance from images captured by a camera are known in the art: for instance, in some techniques, local markings which may or may not be visible depending on the water level are used, or some other form of calibration is performed on site. These techniques may be used to ascertain the level of water in an image, in particular to ascertain the water level compared to a usual or critical water level. The images may be communicated to the central unit by the wireless communication units of the luminaires and analyzed to extract information by the central unit. Alternately or additionally, at least part of the analysis may be performed by processing units which are part of the individual luminaires, in which case it may be possible to minimize the amount of data sent by the individual luminaires to the central unit.

The data about water levels may be aggregated at the central unit, which may output it for instance as a map with indicators, which may be color coded to indicate how far the water level is from the normal water level. In that way, rising water may be signaled in time, and the distribution of flooding patterns may be analyzed. This data may be very useful to local government, to citizens and to insurance companies. Note that this embodiment takes advantage of the fact that the luminaires are part of an extended luminaire network: not only may the plurality of measurements reduce the number of false alerts due to the evident redundancy, but trends may also be identified. It may be, for instance, that flooding at one point is a good indicator of impending flooding at another point. Note that not all luminaires in the luminaire network need to comprise cameras: the skilled person will be capable of selecting a representative, usefully located plurality for this purpose.

Another possible embodiment in which a camera is used is one in which the presence of animals is detected, and in which the detected animals may be tracked and counted. This technique may be especially useful for terrestrial animals, in particular wild animals, such as for instance bears and foxes. These animals may be recognized from images through known image recognition techniques, for instance techniques based on deep learning. These techniques may be applied at processing units of the individual luminaires, or the images may be sent to the central unit through the wireless communication units and be analyzed at the central unit. Once an animal has been detected and identified, it should be possible to track its movement from the area seen by the camera of one individual luminaire to the area seen by the camera of another individual luminaire.

In this way, this embodiment may serve to alert inhabitants to the presence of animals, for instance to the presence of potentially dangerous wild animals. Furthermore, collection of data over time makes it possible to collect statistics which may be of use to animal protection and safety agencies.

In an exemplary embodiment, it may be possible for the camera to be always on and to record the images for a certain pre-determined amount of time in a constantly overwritten buffer. Then, upon detection of a predetermined situation (e.g. an alert situation) and/or upon request (e.g. a request received from the central unit or from a mobile device of a user), the data stored in this buffer may be transferred via the wireless communication unit e.g. to the central unit or to another luminaire or a mobile device of a user.

In other embodiments, the at least one sensor comprises at least one microphone or other sound sensor.

In an exemplary embodiment, the processing unit of a luminaire is configured to generate an acoustic fingerprint based on a sound signal sensed by the microphone or other sound sensor and preferably to transmit a message containing the acoustic fingerprint to the central communication unit and/or to at least one other luminaire. However, in some embodiments the acoustic fingerprint may be analyzed or used only locally within the luminaire. For example, the processing unit may be configured to compare an acoustic fingerprint with a sound sample stored in a data base to determine a type of the sensed sound signal. For example, the database may comprise one or more sound samples associated with electric vehicle engines and one or more sound samples associated with fuel vehicle engines. This will allow determining whether a passing vehicle has a running fuel engine or a running electric engine. However, also other sound samples may be stored, such as sound samples of animal noises, sound samples of a collision between vehicles, sound samples of falling rain, sound samples of gunshot etc. The processing unit may optionally be integrated in the microphone or other sound sensor.

An acoustic fingerprint may be determined using e.g. the Shazam algorithm. Preferably, the acoustic fingerprint algorithm takes into account the perceptual characteristics of the sound, such as any one or more of the following: average zero crossing rate, estimated tempo, average spectrum, spectral flatness, prominent tones across a set of frequency bands, bandwidth.

Alternatively or in addition, the central unit may be configured to generate an acoustic fingerprint based on a sound signal sensed by the microphone or other sound sensor. Further, the central unit may be configured to compare a received acoustic fingerprint with sound samples stored in a data base to determine a type of the sensed sound signal. In that case a database, e.g. a database as exemplified above, may be maintained in the central unit.

It is noted that the central unit is central in the sense that it is associated with a plurality of luminaires. The central unit may comprise e.g. one or more servers located remotely of the plurality of luminaires. However, the central unit may also be located in or near a luminaire. For example, there may be provided as a central unit a segment controller communicating with a plurality of luminaire controllers associated with a plurality of luminaires. Such a segment controller may be located in or near a luminaire.

A possible example embodiment is a system in which the central unit is configured to analyze the messages it receives from the individual luminaires to register, monitor and map sound levels. The messages received from the individual luminaires may be sound recordings or may be pre-processed, e.g. only indicate the received sound level or one or more peaks of an acoustic fingerprint of a sound recording. Collected information about the sound level around a certain luminaire or around a certain subset of luminaires could be very interesting for instance for prospective home-buyers. The output may also be generated in the form of a heat map which displays the sound level based on parameters. The map may for instance display the sound level at a specific time of the day or an average taken over a day, a week, or a longer period. Potentially the type of sound—traffic noise, crowd noise, music, nature—may also be detected and shown on the map.

Another example embodiment is a system to monitor air traffic, in particular of low-flying traffic. This data can be collected and analyzed in the ways described above, wherein the recording by the microphone is analyzed to extract air traffic noise specifically. The detected noise may be automatically associated with flight information, which may be sourced online. The result may be a map on which the trajectory of flights may be followed with the associated resulting sound/noise level.

Advantageously, cameras and microphones/sound sensors may be used in conjunction with each other.

In an example embodiment, upon detection of a sound indicative of a high alert situation captured by the microphone or other sound sensor, the camera is configured to capture (moving) images and to record and/or transmit the captured (moving) images to the central unit. This embodiment may be especially useful for law enforcement.

For instance, the microphone/sound sensor may be constantly on, and the captured sound is analyzed. Advantageously, the sound captured by the microphone may be analyzed by the processing unit of the luminaire, and the processing unit may be configured to send a signal to the control unit and/or other luminaire(s) if a sound indicative of a high alert situation is detected in the sound captured by the microphone, wherein the control unit is configured to control operation of the camera and/or of the communication unit upon receipt of the signal. Here, the analysis is performed by the processing unit of the individual luminaire, which may prevent the necessity of constantly transmitting the captured sound to the central unit via the wireless communication unit. The processing unit may be able to detect certain sounds indicative of a high alert situation, such as gunshots, screaming, someone shouting key words like 'help' or 'fire', and the like. Alternately, this detection may be performed by the central unit if the luminaires send captured sound to this central unit via their wireless communication unit.

The signaling of high alert situations may be done based on sound alone. However, in such high alert situations, the camera may offer more details about the situation. Therefore, in this embodiment, the detection of the sound indicative of a high alert situation may result in images, preferably moving images, captured by the camera of the relevant luminaire to be communicated to the central unit via the wireless communication unit of the relevant luminaire. There are many ways to achieve this. For instance, the camera may start recording only after the sound indicative of a high alert situation is captured. However, in some cases images captured before the sound occurred may also be relevant. In that case, it may be possible for the camera to be always on and to record the images for a certain predetermined amount of time in a constantly overwritten buffer. Then, upon detection of the sound indicative of a high alert situation, the data stored in this buffer may be transferred to the central unit via the wireless communication unit. The central unit may then proceed to analyze the images to identify if there is indeed a high alert situation in progress or to identify false positives, and/or to further transmit the images to law enforcement or another instance for human evaluation of the situation. Furthermore, the location of the detected sound indicative of a high alert situation may be displayed on a map, and a database of such events may be built up over time.

Additionally, there may be a mechanism whereby images are transmitted not just from the luminaire of which the microphone/sound sensor captured the sound indicative of a high alert situation, but also from neighboring luminaires, to be able to give a more thorough overview of the situation. To this end, the luminaire which identifies the sound indicative of a high alert situation may also communicate with neighboring luminaires to activate the associated cameras, for instance in the form of a trigger signal.

Furthermore, in order to narrow down the location at which the high alert situation is happening, the sounds recorded by a group of luminaires grouped closely together may be analyzed, either centrally or locally, to identify where the sound is loudest. The luminaire which recorded the sound with the highest volume is likely to be the luminaire closest to the high alert situation, and therefore the associated camera may be the most relevant camera of which to receive and view the image(s).

Another embodiment in which input from a camera and input from a microphone/sound sensor are combined is one in which the central unit is configured to analyze the received messages to identify and map the presence and/or movement of flying animals, such as birds or bats. Birds may be identified both by the sounds they produce and by how they look. Combining both ways of detection allows for the identification of birds, and may also help to track their movement. The collected data may be used to make a map of 'bird spots' by bird species, and/or to map migration patterns. This data is of interest for instance to animal protection agencies. Note that some pre-processing to identify birds may also take place in a processing unit of an individual luminaire. The skilled person will be able to decide which is most advantageous. Note that it may be possible to identify the birds by sound alone, and therefore an embodiment without cameras is also a possibility.

Another embodiment in which input from a camera and input from a microphone/sound sensor are combined is one in which the central unit is configured to be able to identify a mode in which a vehicle is circulating, for instance by analyzing the sound it makes, and to identify a vehicle which is circulating in a certain mode. In this embodiment, it is for instance possible to detect and track vehicles circulating in thermal mode in an area reserved for electric vehicles. The vehicles may then be identified, for instance by identifying the license plate. Note that it may be that in the future, due to the fact that many vehicles now also sometimes include various chips for wireless communication, and may even have at least one SIM card on board, identification may be performed in other ways.

The measured results may be compiled into a map displaying event locations, along perhaps with images and/or the associated license plate. Long-term statistics and analytics may be synthesized into a heat map which shows the critical points at which violations happen most often, which information may be of use to local government and law enforcement agencies. One may also imagine an automated ticketing system for violators.

In embodiments, the at least one sensor comprises at least one sensor sensitive to smoke and/or heat. The central unit is configured to detect the occurrence of a fire and preferably to track and predict the movement of a fire and/or the associated smoke by combining the data gathered by the sensors comprised in a plurality of luminaires located in the same neighborhood. Alternately or additionally, the processing unit of at least one luminaire may detect the occurrence of a fire based on sensor data of at least one luminaire. The data may also be combined with information about the current winds, either obtained from a source of such data or collected from wind sensors on the luminaires, to predict the progression of a fire and raise appropriate alerts. For instance, people known to be in the neighborhood or to be living in the neighborhood of the fire may receive a message on their phones, for instance showing the location and spread of a fire on the map. Alternatively or additionally, an alert message could be communicated via one or more loudspeakers present on or close to one or more luminaires affected by the alert situation.

In embodiments, the at least one sensor comprises at least one sensor configured to measure air quality, wherein the central unit is configured to analyze the air quality in the area covered by the luminaire network. The data gathered from the luminaire network may be very interesting to local governments, prospective home-buyers, environments agencies etc.

In embodiments, the at least one sensor comprises at least one accelerometer, and the central unit is configured to monitor seismic activity. Also in this case, it is advantageous to have a dense network to filter out false positives, and the data from the plurality of luminaires may help in evaluating an epicenter in the case of seismic activity, to monitor dispersion and intensity, etc. Cross-referencing this collected data with data about damage may help identify which areas need renovating. Furthermore, as above, people known to be in the neighborhood of a seismic incident, or known to be living in the neighborhood of a seismic incident, may receive an alert on their phones. Alternatively or additionally, an alert message could be communicated via one or more loudspeakers present on or close to one or more luminaires affected by the alert situation.

In embodiments, the at least one sensor comprises at least one RF sensor, for instance to monitor the movement of people and/or of vehicles—people through the RF chips found in their phones and other devices, and vehicles which are nowadays often equipped with at least one RF chip.

Especially in conjunction with embodiments in which the at least one sensor comprises at least one camera and/or at least one microphone/sound sensor, the central unit may be configured to analyze the size and movement of crowds moving in the area covered by the luminaire network based on data gathered by the sensors. The combination of data gathered by cameras capturing moving images and data captured by RF sensors is especially advantageous. As before, some (pre-) processing of the data may be performed by processing units of the individual luminaires.

The luminaire network may also comprise different types of sensors, for instance both cameras, sound sensors and RF sensors. Such a system may expand on the one described above in which a possible high alert situation is detected through a sound sensor and confirmed with a camera. In such a system, RF devices close to the luminaire registering a high alert situation could be identified by the RF sensor, and the communication unit of the luminaires or the central communication unit of the central unit may be configured to send alert messages to the detected RF devices. The registering of an alert situation in the neighborhood of a luminaire may be based on any data sensed by the at least one sensor of the luminaire, and the determination of an alert situation may be done either locally in the luminaire or in the central unit. For example, the registering of an alert situation in the neighborhood of a luminaire may be based on a sensed sound signal, an RF signal containing an identification of a vehicle driving in a dangerous manner, image data, etc.

The results gathered by the central unit may be displayed in several different ways, for instance as a heat map of people and/or vehicles passing by during a certain time, or as an average over multiple days or for a specific day, for instance holiday/festival day. Movement of people and/or vehicles may also be analyzed, which may lead to insights about how to change roads, etc. The data may also be visualized as a timeline with an area/crowd. One possible implementation is also to generate an alarm, for instance for law enforcement, if a certain area overcrowds.

In an exemplary embodiment, the control unit of a luminaire may be configured to modify the light (e.g. the intensity and/or the color and/or the color temperature and/or the lighting pattern on the ground and/or the light distribution and/or a flashing pattern of the light) that is being emitted by the luminaire in function of the data sensed by the at least one sensor. For example, the intensity and/or color and/or color temperature of the light may be modified in function of the detected animals. Also, the intensity and/or the distribution and/or a flashing pattern of the light may be changed when an alert situation is determined. Also, the color and/or the color temperature and/or the intensity and/or the distribution of the light may be changed in function of the traffic (cars, bicycles, etc.) and/or in function of the pedestrians passing the luminaire and/or in function of the detected weather, etc.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DETAILED DESCRIPTION OF THE FIGURES

Figure 1:
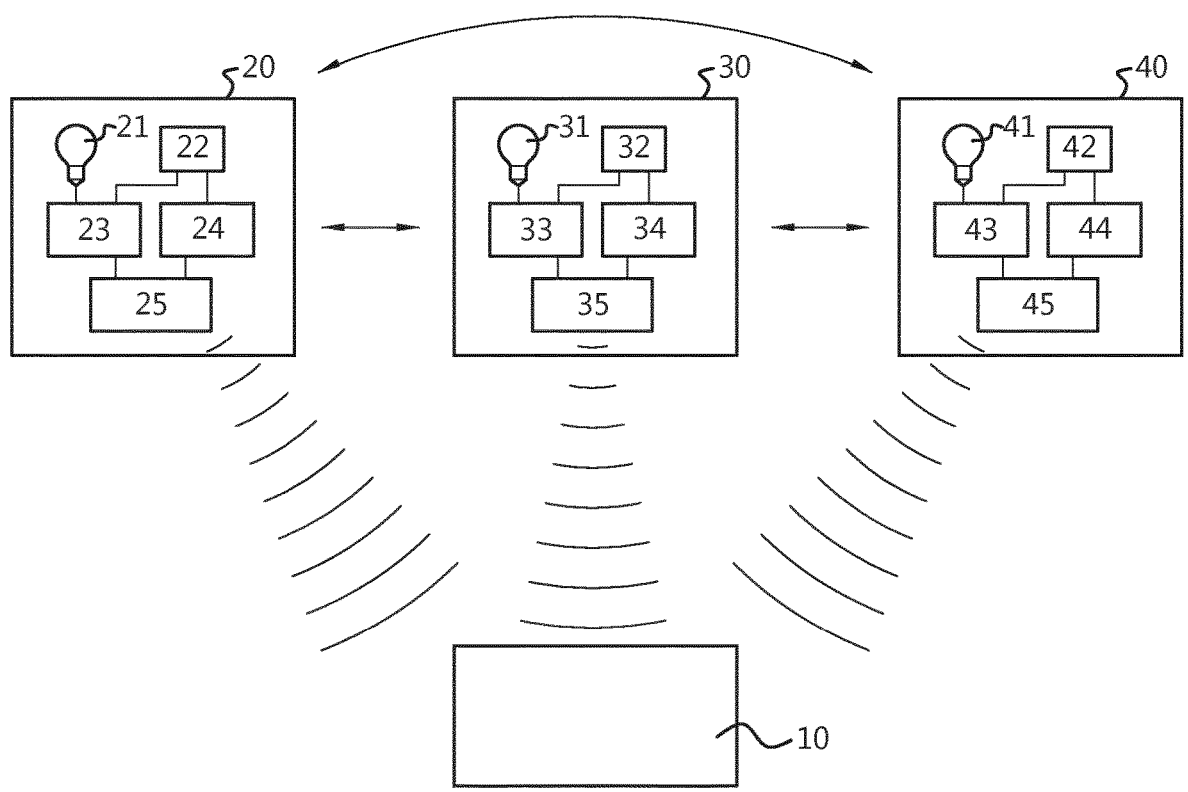
FIG. 1 shows a block diagram of (a section of) an embodiment of a luminaire network.

FIG. 1 shows a block diagram of an embodiment of a luminaire network according to the invention. Note that while in this figure, only three luminaires 20, 30 and 40 are shown, actual luminaire networks may comprise many more luminaires.

Each luminaire 20, 30, 40 comprises a lighting apparatus 21, 31 and 41 controlled by control unit 23, 33, 43. The specific lights will not be described in detail, as many possibilities are known in the art. The lighting apparatus may comprise LEDs (light-emitting diodes) as well as the circuitry to operate them, but the system is not limited to a particular type of light source or associated circuit.

Each luminaire 20, 30, 40 further comprises a wireless communication unit 25, 35, 45. Luminaires equipped with communication units are also well-known in the art, and may utilize protocols and systems as mentioned previously, such as Bluetooth, WiFi, RFID, NFC, LoRA, Zigbee, Thread, Sigfox, GSM, GPRS, LTE, 2G, 3G 4G and 5G, Lifi, Wimax, Ethernet, TCP/IP, Modbus, RS-485, DALI, interbus, fiber optics, PLC, HD-PLC, BPL. The wireless communication unit is connected to the control unit 23, 33, 43: it can receive instructions from this control unit and may also send information received through a wireless network to the control units 23, 33, 43. Furthermore, the wireless communication unit is in communication with the central unit 10. Note that the central unit 10 need not be a physical unit, and certainly not a physically central unit: processing 'in the cloud' is also an example of processing in a central unit 10. Furthermore, for instance if the luminaire network is used for a plurality of different applications, there could be more than one central unit 10.

A plurality of the luminaires 20, 30, 40 in the luminaire network further comprise at least one sensor 22, 32, 42. Note that not all luminaires need to comprise a sensor: some luminaires may be placed in locations where little useful sensor input is to be expected. Furthermore, not all luminaires need to comprise the same sensor or sensors. Many of the above described applications may be combined in the same extended luminaire network, wherein the skilled person designing the luminaire network will take into account the various locations of the luminaires to decide which subset of luminaires should be used for which application, and which subset of luminaires should therefore be equipped with which sensors.

The sensors 22, 32, 42 may be controlled by the respective control units 23, 33, 43. The captured data may be sent directly to the central unit 10 via the wireless communication units 25, 35, 45. However, in many applications it is advantageous for each luminaire to further comprise a processing unit 24, 34, 44, which may process or pre-process the captured data before it is relayed to the central unit 10. For instance, if the sensor 22, 32, 42 is a camera, the processing unit could perform image recognition; if the sensor 22, 32, 42 is a microphone, the processing unit 24, 34, 44 could relay a signal only if the sound level exceeds a certain threshold or if a certain keyword or sound is identified. If the sensor 22, 32, 42 is a smoke sensor, a signal could be sent only if the smoke level exceeds a certain threshold, and so on.

Whether processing is performed by the individual processing units 24, 34, 44, by the central unit 10, or through a combination of pre-processing by the individual processing units 24, 34, 44 and further processing by the central unit will be decided based on factors such as the expense of a more complex/more powerful individual processing units 24, 34, 44, the capacity of the wireless connections of the wireless communication units 25, 35, 45, and so on.

Figure 2:
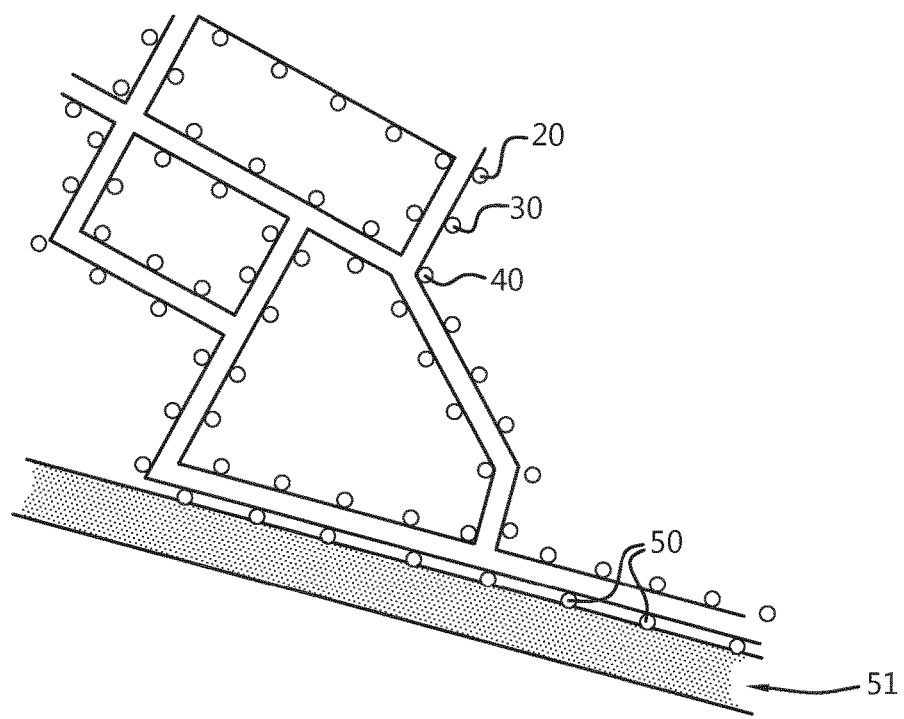
FIG. 2 is a map showing possible locations of luminaires of (the section of) the embodiment of the luminaire network.

FIG. 2 is a fragment of a map with luminaires of an embodiment of the luminaire network indicated. Note that these luminaires 20, 30, 40, 50 are found in places where luminaires would be expected, i.e. at the side of roads. Note furthermore that there is a quite dense network, especially in cities, though of course other distributions are also possible.

In this example, it could for instance be that all luminaires 20, 30, 40, 50 comprise a camera as a sensor, or, if this can also achieve proper coverage, a subset of the luminaires comprise at least one camera as a sensor. Likewise, all luminaires may comprise a microphone or other sound sensor, or a subset of the luminaires is chosen to comprise a microphone or other sound sensor such that proper coverage may be achieved. As an example of how the sensors may be adapted to the locations of the luminaires, it could for instance be that luminaires 50, which are on the border of a waterway 51, may comprise a camera (either as the only sensor or as an additional sensor) pointed towards the water which allows it to monitor the water level in the waterway. Advantageously, multiple luminaires 50 along waterway 51 monitor the waterway, in order to achieve sufficient redundancy such that a false positive, or an accidentally obstructed view, does not impede proper monitoring of the water level.

Figure 3:
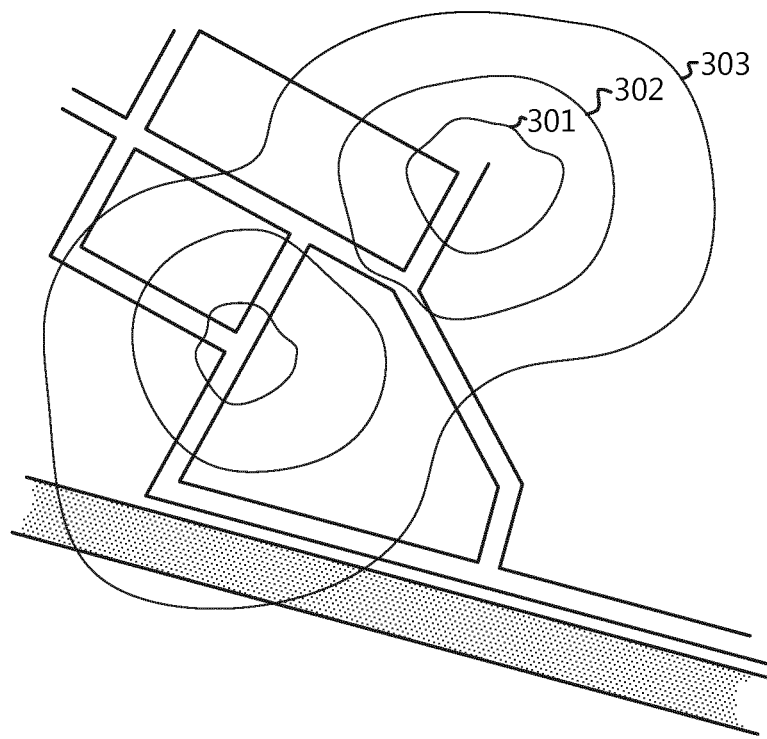
FIG. 3 shows how results obtained from the luminaire network of FIG. 2 may be displayed to a user.

FIG. 3 shows the same map, to illustrate how an example display could show the results gathered by the sensors 22, 32, 42 of the luminaire network. In the example of FIG. 3, the results are shown as a heat map. For instance, if the sensors are microphones or other sound sensors, the heat map shows that inside area 301 on average a high level of sound is detected, inside area 302 but outside area 301 the average sound level is still high but slightly lower, inside area 303 but outside area 302 it was even lower, etc. Areas between two curves have comparable (average) sound levels.

The display may also allow a user to choose which data to visualize. For instance, in an embodiment in which sensors 22, 32, 42 are microphones or other sound sensors, the user could determine whether to see the average overall sound level, the average sound level in a certain time window, a current sound level, etc. Alternately or additionally, the map could also show the occurrence of specific types of sound. Furthermore, in other embodiments, for instance in combination with cameras and/or other sensors, could lead to a map showing where certain birds occur, traffic congestion, crowd density and movement, the path taken by a wild animal, the frequency of high alert situations, areas where there is a lot of illegal parking, the occurrence of fires, the distribution of air pollution, the distribution of seismic activity, water levels compared with an average water level, etc. Other ways of visualizing data, other than heat maps, will be known to the skilled person.

Figure 4:
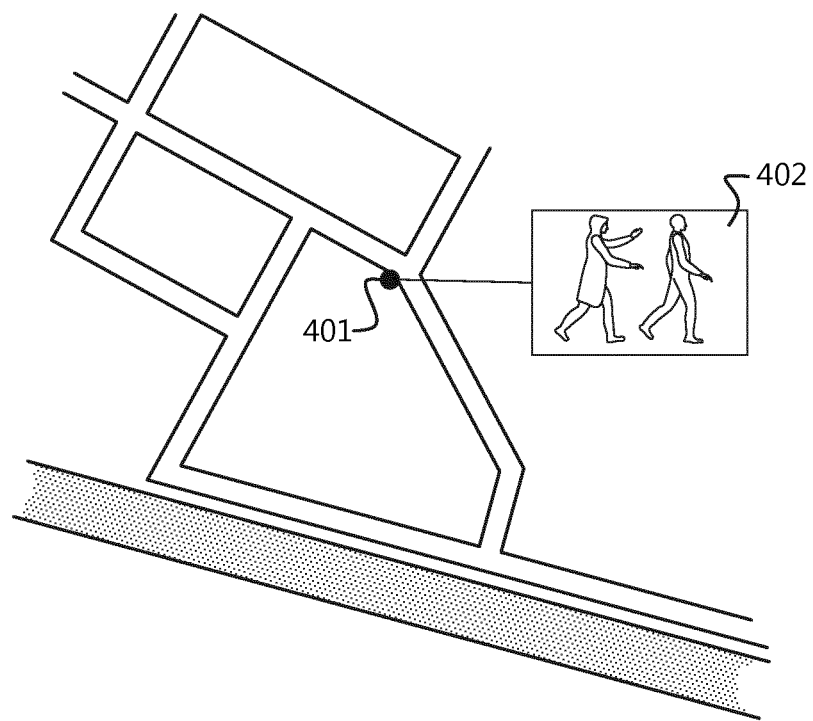
FIG. 4 shows another way in which results obtained from the luminaire network of FIG. 2 may be displayed to a user.

FIG. 4 shows a different display for an embodiment of the present invention. In particular, this embodiment may help in a system where luminaires may be equipped with both a microphone or other sound sensor and at least one camera. On the map, if a sound indicative of a high alert situation is detected, an indication 401 may appear on the map at the location of the associated luminaire. This indication may take many forms, for instance a red dot, and may be accompanied by another form of alert as well. A user may then, for instance by clicking on this indication, open a sub-window 402 which displays the current footage being recorded by the camera of the associated luminaire, which allows a user to ascertain if there is indeed a high alert situation in progress. The interface may also allow a user to rewind to see earlier footage, to access footage also of cameras of neighboring luminaires, and/or, if there is indeed a high alert situation, to forward pertinent information to law enforcement officers which are nearby. To that end, the current position of law enforcement officers may also be displayed on the map: systems for this are known, but here also the luminaire network may be employed, for instance if the luminaires are equipped with RF sensors or other sensors which may detect the presence of a law enforcement officer nearby.

The skilled person will be able to envisage many alterations, combinations, permutations and elaborations on the systems described above. The main inventive idea underlying the invention is that a luminaire network is a dense network, present in populated areas, which have wireless communication capabilities and in many cases some processing capabilities. Adding sensors of various types to these luminaires and analyzing and aggregating data from the plurality of luminaires allows for data collection and insights which would otherwise be difficult to obtain. The skilled person will be able to ascertain which locations are important for selected applications, and will be able to judiciously equip certain subsets in the plurality of luminaires with sensors which allow the network to most efficiently and usefully collect the necessary data for all of the desired applications.

The invention claimed is:

1. A luminaire network, comprising a plurality of luminaires and a central unit, comprising a central communication unit;
wherein each luminaire of the plurality of luminaires comprises:
a communication unit configured to make it possible for the luminaires to communicate with each other or with the central communication unit; and
a control unit configured to control the luminaire and the communication unit;
wherein the central unit is configured to have access to information about the location of the luminaires;
wherein each luminaire of the plurality of luminaires in the luminaire network further comprises at least one sensor which can sense information relating to the environment of the luminaire, wherein the communication unit of said luminaire is configured to send messages relating to the sensed information to the central communication unit or to at least one other luminaire comprising a communication unit, and wherein the central unit is configured to analyze the received messages and to output the results of the analysis;
wherein the central unit is configured to analyze the received messages to register, monitor, and map sound levels.

2. The luminaire network according to claim 1, wherein said luminaires comprising at least one sensor further comprise a processing unit configured to process the sensed information and to generate the message to be sent to the central communication unit or to at least one other luminaire.

3. A luminaire network, comprising a plurality of luminaires and a central unit, comprising a central communication unit;
wherein each luminaire of the plurality of luminaires comprises:
a communication unit configured to make it possible for the luminaires to communicate with each other or with the central communication unit; and
a control unit configured to control the luminaire and the communication unit;
wherein the central unit is configured to have access to information about the location of the luminaires;
wherein each luminaire of the plurality of luminaires in the luminaire network further comprises at least one sensor which can sense information relating to the environment of the luminaire, wherein the communication unit of said luminaire is configured to send messages relating to the sensed information to the central communication unit or to at least one other luminaire comprising a communication unit, and wherein the central unit is configured to analyze the received messages and to output the results of the analysis;
wherein the at least one sensor comprises at least one camera;
wherein the at least one camera is oriented such that a ground surface is imaged, and wherein a processing unit or the central unit is configured to determine a level of water on the ground surface based on such images.

4. The luminaire network according to claim 3, wherein the processing unit is configured to analyze images captured by the camera to detect the presence of a parked vehicle.

5. The luminaire network according to claim 1, wherein the central unit is configured to analyze the received messages to monitor water levels and/or to detect the occurrence of floods; or wherein the central unit is configured to analyze the received messages to detect the presence of animals and to track and count the detected animals.

6. The luminaire network according to claim 2, wherein the processing unit is configured to analyze sensed data, including images captured by a camera, to monitor water levels, or to detect the occurrence of floods; or wherein the processing unit is configured to analyze sensed data, including images captured by a camera, to detect the presence of animals, and wherein the central unit is configured to track and count the detected animals.

7. The luminaire network according to claim 2, wherein the at least one sensor comprises at least one microphone or other sound sensor.

8. The luminaire network of claim 7, wherein the processing unit is configured to generate an acoustic fingerprint based on a sound signal sensed by the microphone or other sound sensor and to transmit a message containing the acoustic fingerprint to the central communication unit or to at least one other luminaire; or wherein the central unit is configured to generate an acoustic fingerprint based on a sound signal sensed by the microphone or other sound sensor; or wherein the central unit is configured to compare a received acoustic fingerprint with sound samples stored in a database to determine a type of the sensed sound signal.

9. The luminaire network according to claim 7, configured such that, upon detection of a sound indicative of a high alert situation captured by the microphone or other sound sensor, the camera is configured to capture images and to record or transmit the captured images to the central unit.

10. The luminaire network according to claim 9, wherein the sound captured by the microphone is analyzed by the processing unit, and wherein the processing unit is configured to send a signal to the control unit if a sound indicative of a high alert situation is detected in the sound captured by the microphone, wherein the control unit is configured to control operation of the camera or of the communication unit upon receipt of the signal.

11. The luminaire network according to claim 7, wherein the central unit is configured to generate a map with the trajectories of flights with the associated sound/noise level based on the images by the at least one camera and the sound recorded by the at least one microphone or other sound sensor of the plurality of luminaires.

12. The luminaire network according to claim 1, wherein the central unit is configured to analyze the received messages to identify and map the presence or movement of birds; or wherein the central unit is configured to identify a mode in which a vehicle is circulating, and to identify a vehicle which is circulating in a certain mode; or wherein the central unit is configured to monitor and track air traffic.

13. A luminaire network, comprising a plurality of luminaires and a central unit, comprising a central communication unit;

wherein each luminaire of the plurality of luminaires comprises:

a communication unit configured to make it possible for the luminaires to communicate with each other or with the central communication unit; and a control unit configured to control the luminaire and the communication unit;

wherein the central unit is configured to have access to information about the location of the luminaires;

wherein each luminaire of the plurality of luminaires in the luminaire network further comprises at least one sensor which can sense information relating to the environment of the luminaire, wherein the communication unit of said luminaire is configured to send messages relating to the sensed information to the central communication unit or to at least one other luminaire comprising a communication unit, and wherein the central unit is configured to analyze the received messages and to output the results of the analysis;

wherein the at least one sensor comprises at least one microphone or other sound sensor;

wherein the central unit is configured to identify a mode in which a vehicle is circulating based on the data sensed by the at least one microphone and/or other sound sensor, and to identify a vehicle which is circulating in a certain mode based on data sensed by at least one of the following sensors: camera, RF sensor.

14. The luminaire network of claim 3, wherein the at least one camera is configured to capture images during a predetermined period of time in a constantly over-written buffer, and, upon detection of a high alert situation, the communication unit is configured to transmit the data stored in the buffer to the central unit.

15. The luminaire network according to claim 1, wherein the at least one sensor comprises at least one sensor sensitive to smoke or heat;

wherein the central unit is configured to detect the occurrence of a fire and to track and predict the movement of the fire or associated smoke.

16. The luminaire network according to claim 2, wherein at least one processing unit of a luminaire is configured to detect the occurrence of a fire and to track and predict the movement of the fire or associated smoke.

17. The luminaire network according to claim 1, wherein the at least one sensor comprises at least one sensor configured to measure air quality, wherein the central unit is configured to analyze the air quality in the area covered by the luminaire network; or wherein the at least one sensor comprises at least one accelerometer, and wherein the central unit is configured to monitor seismic activity; or wherein the at least one sensor comprises at least one RF sensor, wherein RF devices close to the luminaire registering a high alert situation are identified by the at least one RF sensor, and wherein either the communication unit of the luminaires or the central communication unit of the central unit is configured to send an alert message to the detected RF devices.

18. The luminaire network according to claim 1, wherein the central unit is configured to analyze the size and movement of crowds moving in the area covered by the luminaire network.

19. The luminaire network according to claim 1, wherein the central unit is configured to determine a type of registered sound signal, and preferably to show said type of registered sound signal on a map.

20. The luminaire network according to claim 3, wherein a local marking is arranged on the ground surface.

* * * * *